(12) United States Patent
Miyata

(10) Patent No.: US 8,588,868 B2
(45) Date of Patent: Nov. 19, 2013

(54) COMMUNICATION TERMINAL AND COMPUTER-READABLE STORAGE MEDIUM

(75) Inventor: Katsuya Miyata, Kanagawa (JP)

(73) Assignee: NEC Corporation, Tokyo (JP)

( * ) Notice: Subject to any disclaimer, the term of this patent is extended or adjusted under 35 U.S.C. 154(b) by 1323 days.

(21) Appl. No.: 12/082,935

(22) Filed: Apr. 14, 2008

(65) Prior Publication Data

US 2008/0254841 A1    Oct. 16, 2008

(30) Foreign Application Priority Data

Apr. 13, 2007 (JP) ................. 2007-106071

(51) Int. Cl.
*H04M 1/00* (2006.01)
*H04B 1/16* (2006.01)

(52) U.S. Cl.
USPC ...................... 455/574; 455/343.5; 455/553.1

(58) Field of Classification Search
None
See application file for complete search history.

(56) References Cited

U.S. PATENT DOCUMENTS

| | | | |
|---|---|---|---|
| 7,830,845 B2 * | 11/2010 | Bennett | 370/338 |
| 2005/0288054 A1 | 12/2005 | Sakaniwa | |
| 2006/0078060 A1 * | 4/2006 | Greszczuk et al. | 375/260 |
| 2006/0184813 A1 * | 8/2006 | Bui | 713/320 |
| 2007/0042801 A1 | 2/2007 | Miyata | |
| 2007/0121536 A1 | 5/2007 | Aihara | |
| 2007/0129045 A1 * | 6/2007 | Aerrabotu | 455/343.5 |

FOREIGN PATENT DOCUMENTS

| | | |
|---|---|---|
| JP | 2001-102997 | 4/2001 |
| JP | 2003-519993 | 6/2003 |
| JP | 2003-218770 | 7/2003 |
| JP | 2004-312069 | 11/2004 |
| JP | 2004-320590 | 11/2004 |
| JP | 2006-074603 | 3/2006 |
| JP | 2006-210993 | 8/2006 |
| KR | 20060018505 | 3/2006 |
| KR | 20060094561 | 8/2006 |
| WO | WO 01/50780 | 7/2001 |

* cited by examiner

*Primary Examiner* — Huy C Ho
(74) *Attorney, Agent, or Firm* — Cozen O'Connor

(57) ABSTRACT

A controller of the communication terminal identifies, after power is turned on, whether or not to use a cellular phone communicating unit or a wireless LAN communicating unit based on communication system information stored beforehand in a storing unit. When the identification is complete, the controller initializes the cellular phone communicating unit, and, according to results of the identification, causes the cellular phone communicating unit to enter standby state or sleep state. Next, the controller initializes the wireless LAN communicating unit, and, according to results of the identification, causes the wireless LAN communicating unit to enter standby state or sleep state. When an application which using a wireless communicating unit in sleep state is launched, the controller causes that wireless communicating unit to enter standby state from sleep state.

11 Claims, 16 Drawing Sheets

FIG.2

COMMUNICATION SYSTEM INFORMATION

| COMMUNICATING UNIT | COMMUNICATION SYSTEM | USE STATE |
|---|---|---|
| CELLULAR PHONE COMMUNICATING UNIT | CELLULAR PHONE COMMUNICATION | USE/DO NOT USE |
| WIRELESS LAN COMMUNICATING UNIT | WIRELESS LAN COMMUNICATION | USE/DO NOT USE |

COMMUNICATION TERMINAL AND COMPUTER-READABLE STORAGE MEDIUM

BACKGROUND OF THE INVENTION

1. Field of the Invention

The present invention relates to a communication terminal provided with a plurality of wireless communication units, and a computer-readable storage medium for causing a computer to function as a communication terminal.

2. Description of the Related Art

Mobile communication terminals capable of communicating using many different wireless communication systems and frequency bands are in existence. Examples include mobile communication terminals which use the PDC (Personal Digital Cellular) system and the PHS (Personal Handyphone System), mobile communication terminals which use the W-CDMA (Wideband Code Division Multiple Access) system and the wireless LAN (Wireless Local Area Network) communication system, and mobile communication terminals which use the same communication system but the frequency is in the 800 MHz band and the 2 GHz band.

Such mobile communication terminals provided with a plurality of communication units typically comprise circuits corresponding to each communication unit. Accordingly, such mobile communication terminals consume more power than mobile communication terminals provided with a single communication unit. Mobile communication terminals comprising a plurality of communication units therefore have shorter standby times and communication times.

Accordingly, in order to avoid increasing power consumption, for example, a method for performing wireless communication selectively using a plurality of wireless communication methods is disclosed in Unexamined Japanese Patent Application KOKAI Publication No. 2001-102997. This method is a method in which power is supplied only to a communication device corresponding to a selected wireless communication system, and supply of power is stopped to other communication devices corresponding to other wireless communication systems.

However, with this method, the selected communication device must be initialized when selecting a communication device to initiate communication. Accordingly, this method has the problem of a time lag when selecting a communication device to initiate communication.

SUMMARY OF THE INVENTION

The present invention was achieved to solve the above problem. The present invention has an object to provide a communication terminal and a computer-readable storage medium capable of reducing the time until initiation of communication while suppressing power consumption.

To achieve this object, a communication terminal according to a first aspect of the present invention comprises: a first communicating unit for performing wireless communication; a second communicating unit for performing a type of wireless communication different from the first communicating unit; and a controller for controlling the first communicating unit and the second communicating unit; wherein the controller causes the first communicating unit and the second communicating unit to execute an initialization process for initiating wireless communication when power to the communication terminal is turned on; and, once the first communicating unit has completed the initialization process, causes the first communicating unit to execute a standby entering process for entering a standby state capable of wireless communication, and once the second communicating unit has completed the initialization process, causes the second communicating unit to execute a sleep entering process for entering a sleep state in which wireless communication is halted.

It is also, for example, possible for the controller to cause the second communicating unit to execute a sleep cancelling process for cancelling a sleep state when the second communicating unit executes wireless communication, and to cause the second communicating unit to execute a first standby entering process for entering a first reception state when the sleep cancelling process is complete.

It is also, for example, possible for the controller to further comprise an application commanding unit for commanding an application using the second communicating unit to launch or stop; wherein the controller causes the second communicating unit to perform the sleep cancelling process for cancelling the sleep state when the application commanding unit commands the application to launch while the second communicating unit is in a sleep state, causes the second communicating unit to execute a first standby entering process for entering a first reception state once the sleep cancelling process is complete, and causes the second communicating unit to execute a second standby entering process for entering a second reception state once the first standby entering process is complete.

It is also, for example, possible for the controller to cause the second communicating unit to execute a reception operation changing process for entering the first reception state from the second reception state when the second communicating unit has finished wireless communication.

It is also, for example, possible for the controller to further comprise a timer for measuring time and identifying that a predetermined amount of time has elapsed; wherein the controller launches the timer when the second communicating unit has finished wireless communication, and causes the second communicating unit to execute the reception operation changing process when the timer has measured a predetermined amount of time.

For example, the first reception state is a state in which data is periodically received at a predetermined interval, and the second reception state is a state in which data is received continuously.

For example, the first reception state is a state in which data is periodically received at a predetermined interval, and the second reception state is a state in which data is received periodically at an interval shorter than the predetermined interval.

It is also, for example, possible for the controller to halt communication of the first communicating unit until the second communicating unit has completed an initialization process, in a case in which the first communicating unit is in a standby state when the controller is causing the second communicating unit to execute an initialization process.

It is also, for example, possible for the second communicating unit to comprise an operating clock signal generating unit for generating an operating clock signal of the second communicating unit; wherein the operating clock signal generating unit generates an operating clock signal having a lower frequency than a frequency before entering the sleep state, when the second communicating unit enters the sleep state.

It is also, for example, possible for the second communicating unit to comprise a storing unit for storing information generated before the second communicating unit enters a sleep state; wherein the storing unit holds the information generated, after the second communicating unit has entered the sleep state.

It is also, for example, possible for the communication terminal to comprise a power source for reducing or stopping a supply of power to component elements provided to the second communicating unit, operation of which component elements need not be maintained in the sleep state, when the second communicating unit is in the sleep state.

In order to achieve the above object, a computer-readable storage medium according to a second aspect of the present invention stores a program for causing a computer, when launching, to perform the steps of: causing a first communicating unit to execute an initialization process, and to execute a standby entering process for entering a standby state when the initialization process is complete; and causing a second communicating unit to execute an initialization process, and to execute a sleep entering process for entering a sleep state when the initialization process is complete.

With the present invention, the amount of time until initiation of communication can be reduced while suppressing power consumption in a communication terminal.

BRIEF DESCRIPTION OF THE DRAWINGS

FIG. 2 is a diagram showing an example of a configuration of communication system information corresponding to types of communicating units, communication systems of each communicating unit, and usage state of each communicating system.

DETAILED DESCRIPTION OF THE PREFERRED EMBODIMENTS

First Embodiment

Below embodiments of the present invention will be described in detail with reference to the drawings. A mobile terminal is used as an example in the embodiments of the present invention.

A constitution of a mobile terminal 1 according to a first embodiment is described below.

Figure 1:
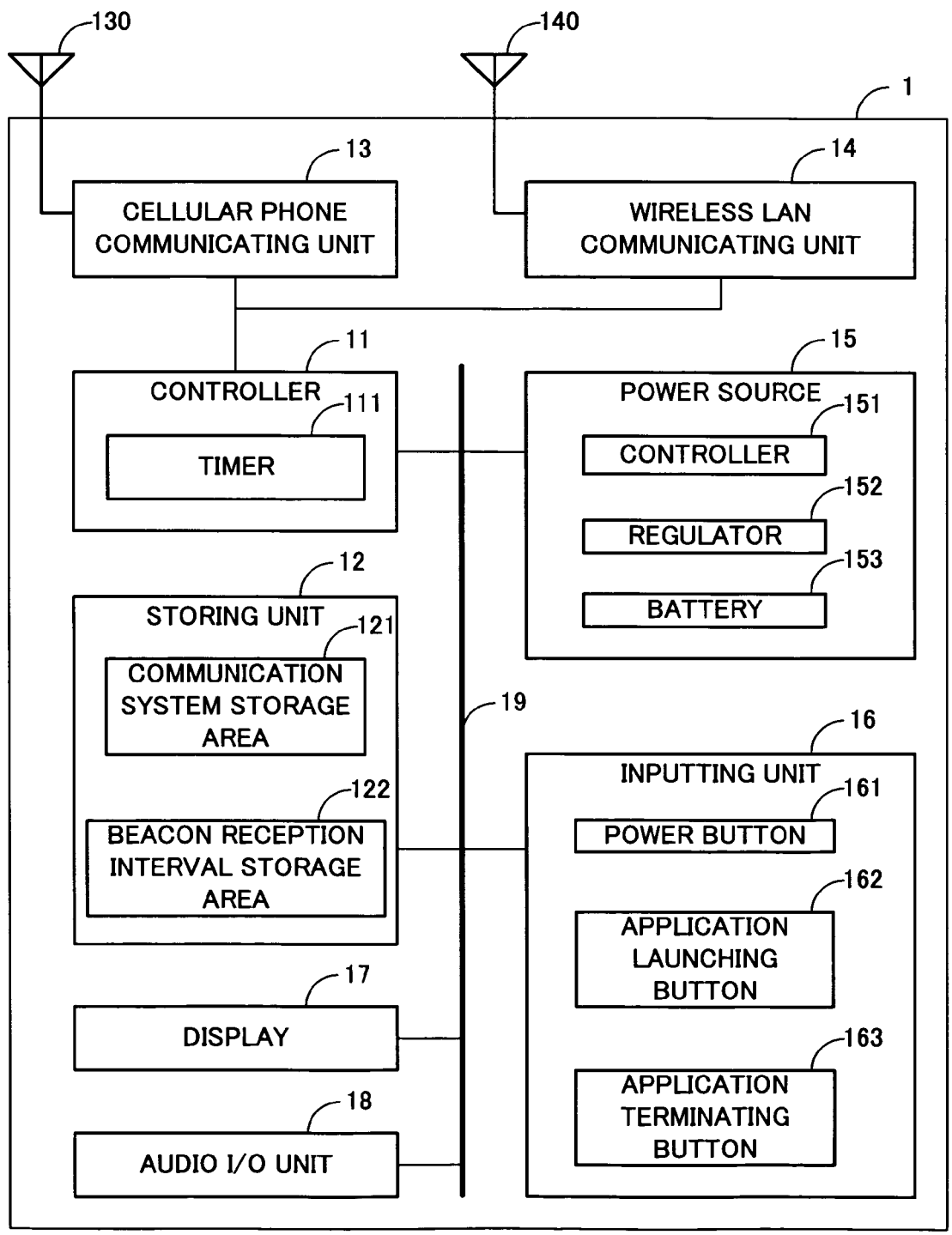
FIG. 1 is a block diagram showing an example of a configuration of a mobile terminal according to a first embodiment.

As shown in FIG. 1, the mobile terminal 1 comprises a controller 11, a storing unit 12, a cellular phone communicating unit 13, a wireless LAN communicating unit 14, a power source 15, an inputting unit 16, a display 17, an audio I/O unit 18, and a bus 19.

The controller 11 is constituted by a CPU (Central Processing Unit), etc., and controls the entirety of the mobile terminal 1 in accordance with programs stored in the storing unit 12 described below. For example, the controller 11 gives the power source 15 a command to supply power to the cellular phone communicating unit 13 and the wireless LAN communicating unit 14.

The controller 11 controls the cellular phone communicating unit 13 and the wireless LAN communicating unit 14 separately also. For example, when power is turned on to the mobile terminal 1, the controller 11 initializes the cellular phone communicating unit 13 and the wireless LAN communicating unit 14. Thereafter, the controller 11 puts the cellular phone communicating unit 13 and the wireless LAN communicating unit 14 into a preset operating mode.

The controller 11 comprises a timer 111. The timer 111 is, consisting of, for example, a software timer or the like, and measures the amount of time elapsed from a certain point in time, thus judging whether or not a predetermined amount of time has elapsed.

The storing unit 12 stores programs, audio data, video data, email data, web data, user data, and so on. The storing unit 12 stores, for example, a program for execution by the controller 11. The storing unit 12 may also be constituted by memory built into the mobile terminal 1 such as RAM (Random Access Memory) and/or ROM (Read Only Memory), or an external memory such as a removable memory card, flash memory, and the like.

The storing unit 12 comprises a communication system storage area 121 and a beacon reception interval storage area 122.

The communication system storage area 121 stores communication system information which indicates the communication system. As shown in FIG. 2, communication system information is the information indicating a type of communicating unit, information indicating a communication system of each communicating unit, and information indicating a usage state of each communicating unit with correspondence to one another. With the present embodiment, the communication system information indicates one of "Use cellular phone communication/Do not use wireless LAN communication," "Do not use cellular phone communication/use wireless LAN communication," and "Use both cellular phone communication and wireless LAN communication."

The beacon reception interval storage area 122 of the storing unit 12 contains information indicating a "beacon reception interval T" which is an interval with which the power source 15 periodically supplies power to the wireless LAN communicating unit.

The cellular phone communicating unit 13 performs audio conversation, email/web, and other data communication with wireless base stations (not shown) based on a cellular phone communication system such as CDMA2000 (Code Division Multiple Access 2000) or W-DCMA (Wideband Code Division Multiple Access).

The wireless LAN communicating unit 14 performs wireless communication different from the cellular phone communicating unit 13. The wireless LAN communicating unit 14 receives a beacon frame transmitted from an access point (not shown). The wireless LAN communicating unit 14 performs data communication, for example, using a wireless LAN communication system such as IEEE (the Institute of Electrical and Electronic Engineers) 802.11b.

Continuous reception mode (Active Mode) and periodical reception mode (Power Save Mode) are operating modes of the wireless LAN communicating unit 14. A beacon frame is transmitted from an access point in a fixed period (a beacon period). In continuous reception mode (Active Mode), the wireless LAN communicating unit 14 receives beacon frames continuously. In periodical reception mode (Power Save Mode), the wireless LAN communicating unit 14 receives selected beacons based on the beacon reception interval T stored in the beacon reception interval storage area 122.

Note that the beacon reception interval in wireless LAN communication is determined based on a transmission interval of beacon frames transmitted by an access point (a Beacon Interval), a parameter indicating the interval of the received beacon frames (a Listen Interval), and information (Receive DTIMs) indicating whether or not to receive all beacon frames called DTIM (Delivery Traffic Indication Message).

The wireless LAN communicating unit 14 changes the operating state from beacon reception mode to continuous reception mode according to a command from the controller 11 when execution of wireless LAN communication is requested in periodical reception mode.

When wireless LAN communication is finished, the controller 11 launches the timer 111 to measure time. If wireless LAN communication is not requested within a predetermined time, the wireless LAN communicating unit 14 changes the operating mode from continuous reception mode to periodical reception mode in accordance with a command from the controller 11.

Figure 3:
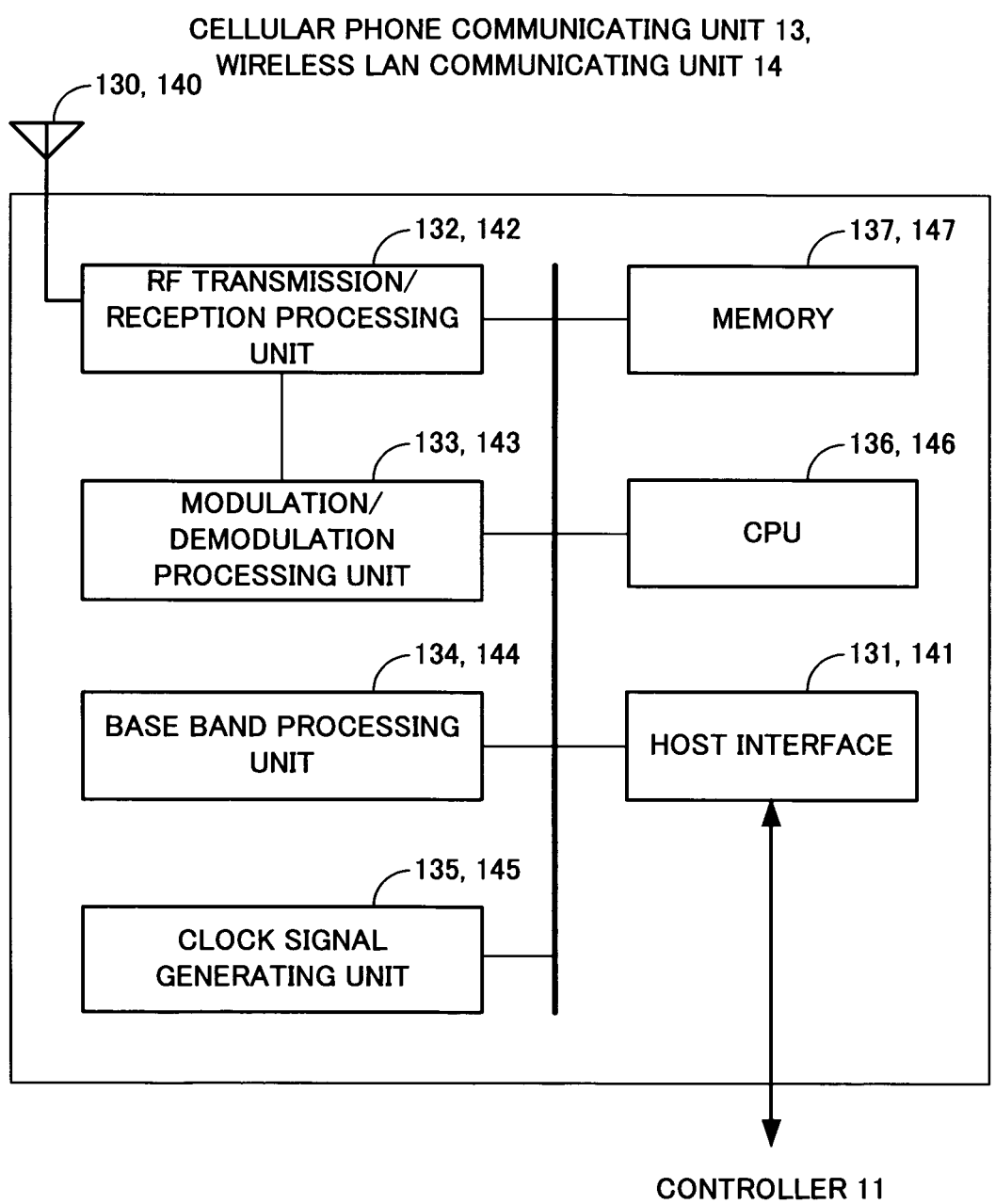
FIG. 3 is a block diagram showing an example of a configuration of a cellular phone communicating unit and a wireless LAN communicating unit.

As shown in FIG. 3, the cellular phone communicating unit 13 and the wireless LAN communicating unit 14 comprise substantially identical constitutions.

The cellular phone communicating unit 13 comprises a host interface 131, an RF (Radio Frequency) transmission/reception processing unit 132, a modulation/demodulation processing unit 133, a base band processing unit 134, a clock signal generating unit 135, a CPU 136, a memory 137, and an antenna 130.

Similarly, the wireless LAN communicating unit 14 comprises a host interface 141, an RF transmission/reception processing unit 142, a modulation/demodulation processing unit 143, a base band processing unit 144, a clock signal generating unit 145, a CPU 146, a memory 147, and an antenna 140.

Each component is described below, using the wireless LAN communicating unit 14 as an example.

The host interface 141 connects the CPU 146 and the controller 11 to allow communication therebetween.

The RF transmission/reception processing unit 142 is connected to the antenna 140 and receives or transmits wireless radio signals.

The modulation/demodulation processing unit 143 demodulates reception signals and plays back and outputs a base band signal. The modulation/demodulation processing unit 143 further modulates the base band signal and outputs a transmission signal.

The base band processing unit 144 splits data in the played-back base band signal, and then decodes, converts to analog, and outputs the split data. The base band processing unit 144 further encodes a digital audio signal collected and output by the audio I/O unit 18, and generates a base band signal.

The clock signal generating unit 145 generates an operating clock signal and supplies it to each component of the wireless LAN communicating unit 14. The frequency of the operating clock signal is lower when the wireless LAN communicating unit 14 is in a sleep state than when the wireless LAN communicating unit 14 is in a communication state or in a standby state.

The CPU 146 controls operation of each component of the wireless LAN communicating unit 14 according to commands from the controller 11 and/or a communication operation control program stored in the memory 147.

The memory 147 is constituted by a volatile memory such as RAM. The memory 147 stores communication operation control programs transferred from the controller 11 and data such as operating parameters used in controlling the operation of each component of the wireless LAN communicating unit 14. The memory 147 is supplied with power needed to maintain storage operations even when in a sleep state in which the wireless LAN communicating unit 14 is halted. Therefore, even after the wireless LAN communicating unit 14 has entered sleep state, the memory 147 holds information stored before entering a sleep state.

Returning to FIG. 1, the power source 15 is constituted by a controller 151, a regulator 152, a battery 153, and so on. The power source 15 supplies power to each unit of the mobile terminal 1 according to commands from the controller 11. For example, the power source 15 reduces (for example by lowering the voltage) or stops the power supplied to components whose functionality need not be maintained when the wireless LAN communicating unit 14 is in sleep state. The power when the cellular phone communicating unit 13 or the wireless LAN communicating unit 14 is in sleep state is therefore less than the power supplied when both are in standby mode. The power source 15 supplies power to the controller 11 and for backup to the memory 147 when the power to the mobile terminal 1 is off.

The inputting unit 16 is constituted by a touch panel, a keyboard, a mouse, and an audio input device, and so on. The inputting unit 16 comprises a power button 161, an application launching button 162, an application terminating button 163, and so on.

The power button 161 is operated by a user and supplies information of operations turning the power to the mobile terminal 1 on and off.

The application launching button 162 and the application terminating button 163 are operated by the user, and supply information of operations to launch or terminate applications which use the cellular phone communicating unit 13 or the wireless LAN communicating unit 14 to the controller 11. Applications which use the cellular phone communicating unit 13 or the wireless LAN communicating unit 14 include, for example, a web browser, an email application for sending and receiving emails, a content transfer application, an audio conversation application, and so on.

The display 17 is, for example, constituted by a dot-matrix-type LCD (liquid crystal display) panel, a driver circuit, and so on, and displays any visual imagery including emails, the web, a basic operation screen, and other screens. The display 17 may also comprise a plurality of display screens such as a main screen and sub screens.

The audio I/O unit 18 comprises an audio input unit for collecting audio signals input during conversation, etc., and converting these signals to electric signals, and an audio output unit for outputting demodulated audio signals during conversation, etc. The bus 19 connects the various components, and transmits data.

Next, operation of the mobile terminal 1 is described.

First, referring to FIGS. 4 to 11, operation of the mobile terminal 1 from the power being turned on to entering standby state for cellular phone communication is described.

Figure 4:
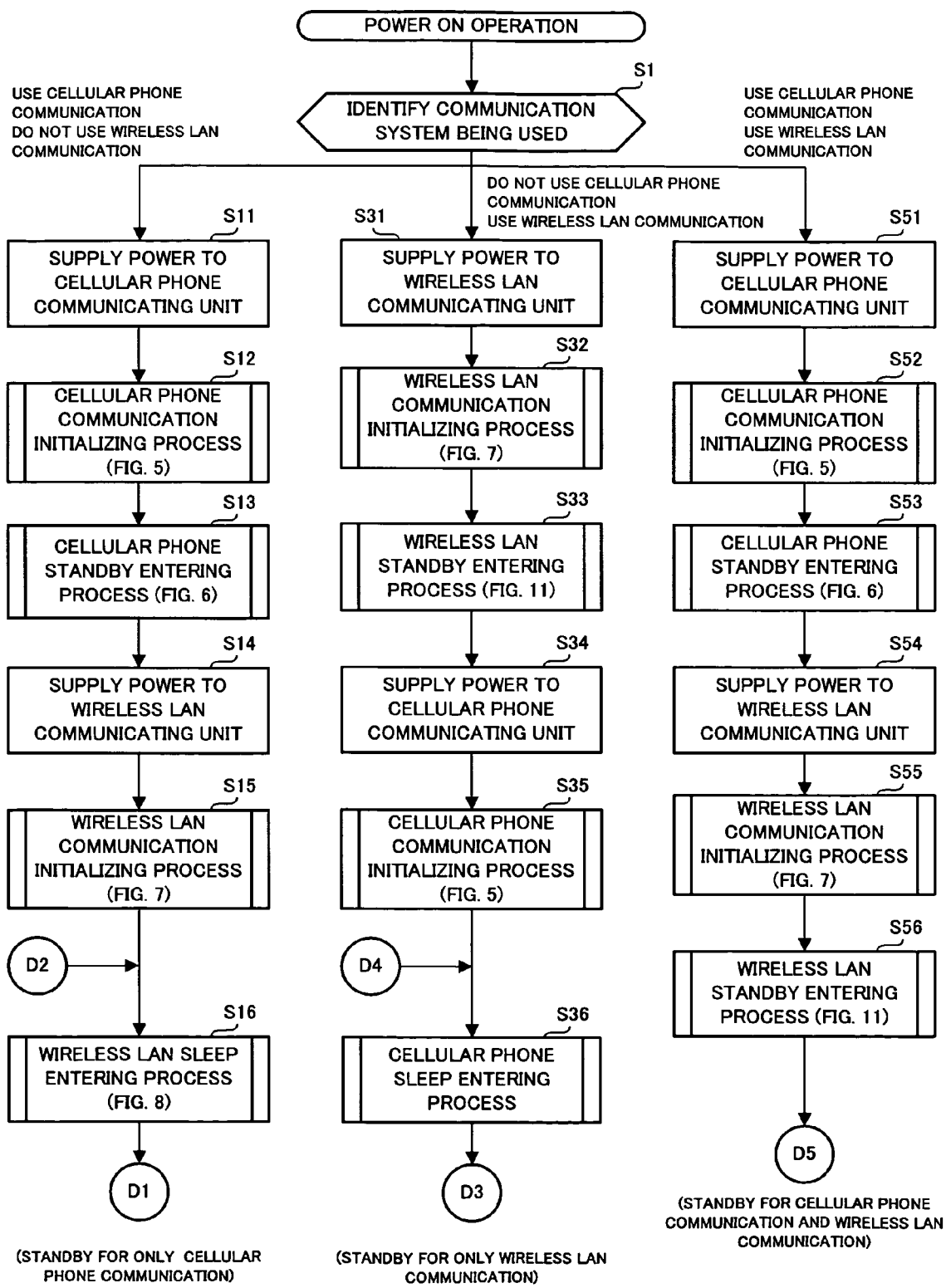
FIG. 4 is a flowchart showing an example of a process of a mobile terminal according to the first embodiment.

When the power button 161 is operated and the power to the mobile terminal 1 is turned on, the controller 11 initiates a power on operation process in FIG. 4.

In the power on operation process, the controller 11 reads communication system information in the communication system storage area 121 of the storing unit 12 and identifies the settings in the communication system information (step S1).

If the controller 11 identifies that "use cellular phone communication/Do not use wireless LAN communication" is set, the controller 11 moves the process to step S11. The controller 11 supplies power to the cellular phone communicating unit 13 (step S11). Specifically, the controller 11 controls the power source 15 to supply power to the host interface 131, the RF transmission/reception processing unit 132, the modulation/demodulation processing unit 133, the base band processing unit 134, the clock signal generating unit 135, the CPU 136, and the memory 137.

Next, the controller 11 executes a cellular phone communication initializing process (step S12).

Figure 5:
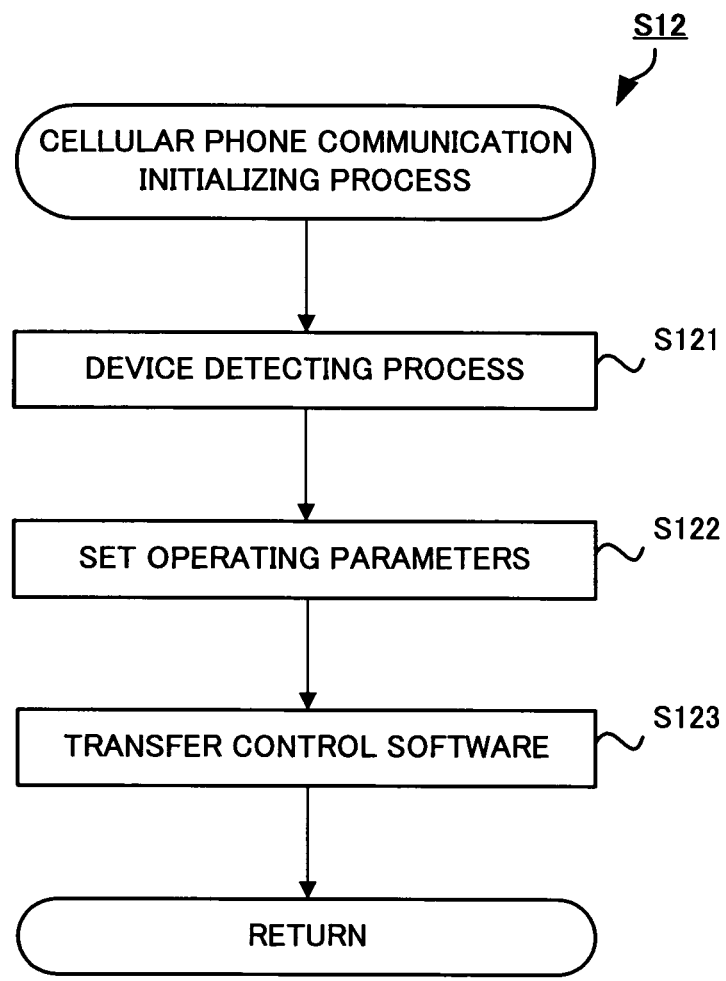
FIG. 5 is a flowchart showing an example of a cellular phone communication initializing process.

As shown in FIG. 5, the controller 11 detects devices of the mobile terminal 1 (step S121). Next, the controller 11 reads operating parameters for each component of the cellular phone communicating unit 13 from the storing unit 12 and sets the operating parameters thus read to the corresponding components (step S122). The controller 11 further transfers control programs stored in the storing unit 12 to the memory 137 of the cellular phone communicating unit 13 for storage (step S123). The controller 11 thus terminates the cellular phone communication initializing process.

Next, the controller 11 works with the CPU 136 of the cellular phone communicating unit 13 to execute a cellular phone standby entering process of the cellular phone communicating unit 13, thereby causing the cellular phone communicating unit 13 to enter standby state (step S13).

Figure 6:
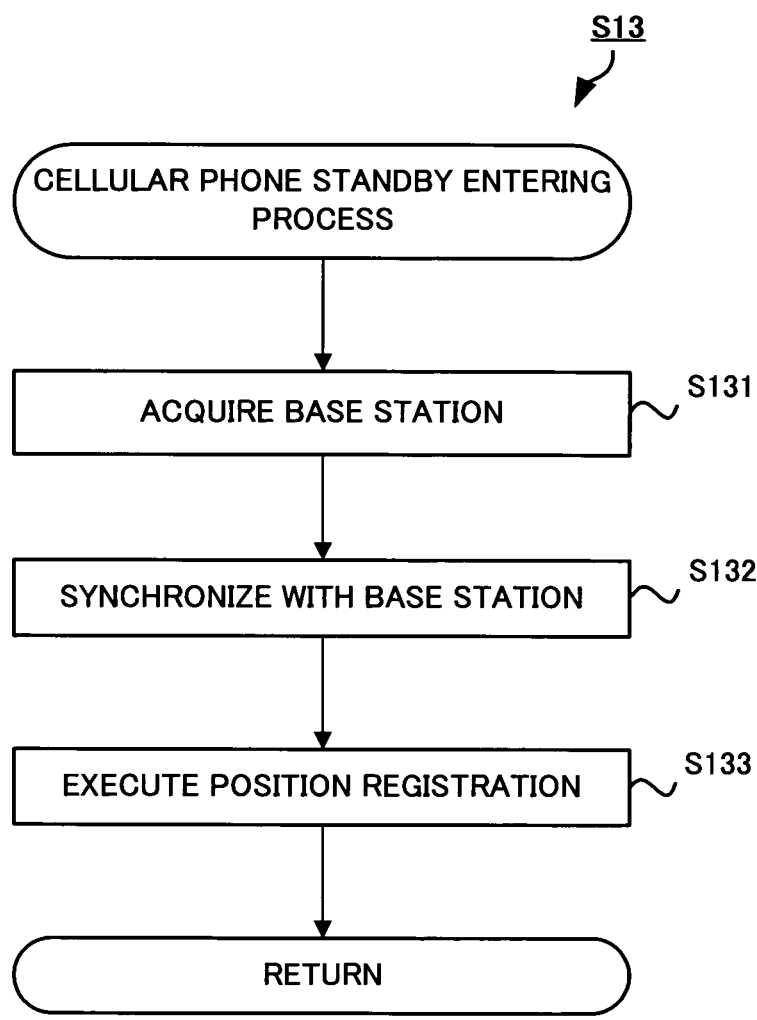
FIG. 6 is a flowchart showing an example of a cellular phone standby entering process.

As shown in FIG. 6, the controller 11 receives a pilot signal transmitted from a base station and acquires the base station (step S131). Next, the controller 11 acquires a signal in a synchronization channel included in the pilot signal, and synchronizes with the acquired base station (step S132). The controller 11 further registers position information of the mobile terminal 1 in a database (not shown) held by the base station (step S133). The controller 11 thus terminates the mobile terminal standby entering process.

Next, irrespective of the use state of wireless LAN communication, the controller 11 controls the power source 15 to supply power to the wireless LAN communicating unit 14 (step S14). Specifically, the controller 11 controls the power source 15 to supply power to the host interface 141, the RF transmission/reception processing unit 142, the modulation/demodulation processing unit 143, the base band processing unit 144, the clock signal generating unit 145, the CPU 146, and the memory 147.

Next, the controller 11 works together with the CPU 146 of the wireless LAN communicating unit 14 to execute a wireless LAN communication initializing process (step S15).

Figure 7:
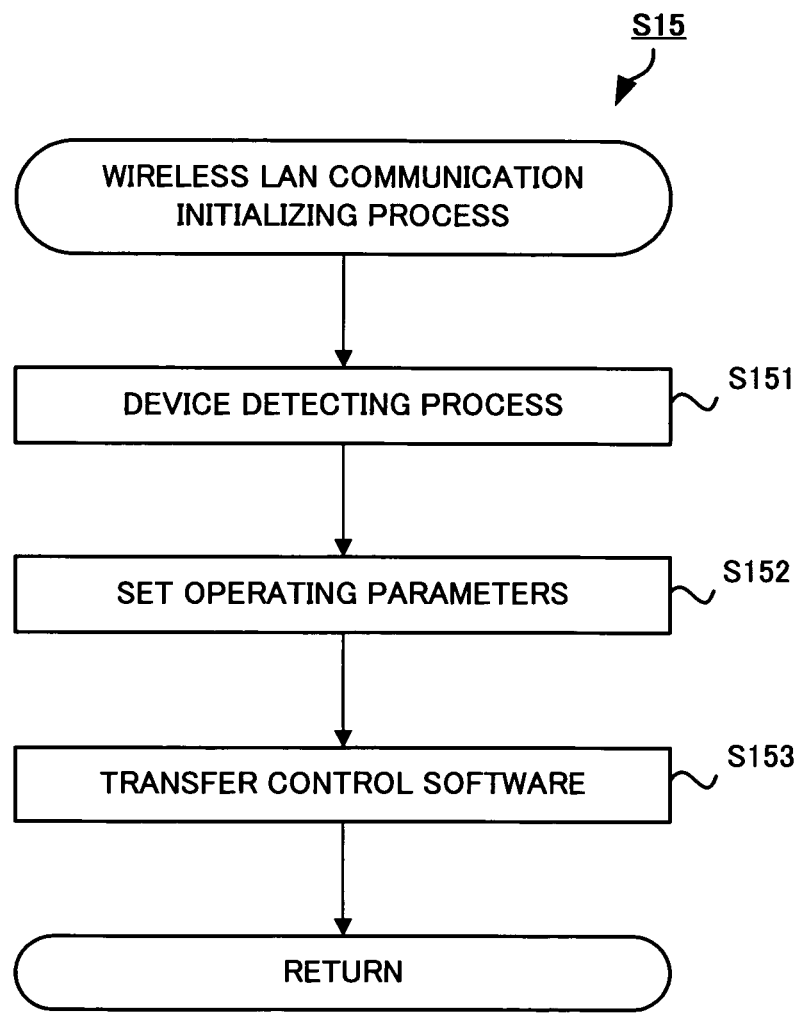
FIG. 7 is a flowchart showing an example of a wireless LAN communication initializing process.

As shown in FIG. 7, the controller 11 detects devices of the mobile terminal 1 (step S151). Next, the controller 11 reads operating parameters and communication setting information for each component of the wireless LAN communicating unit 14 in the storing unit 12 and sets these to the corresponding components (step S152). The controller 11 then reads a program for controlling the wireless LAN communicating unit 14 from the storing unit 12, and stores this in the memory 147 (step S153). The controller 11 thus terminates the wireless LAN communication initializing process.

Note that during detection (the process in step S151), a process for detecting the wireless LAN communicating unit 14 is also included, in a case in which the wireless LAN communicating unit 14 and the mobile terminal 1 are connected via an interface (for example, a PC card, a CF card, a USB (Universal Serial Bus), an SDIO (Secure Digital Input/Output), etc.). The communication setting information of each component is information indicating, for example, channels used in wireless LAN communication, the type of wireless LAN (11a/b/g/n), an SSID (Service Set Identifier), an encoding system, an authenticating system, and so on. The controller 11 may also perform a process for receiving a beacon frame transmitted from an access point via the wireless LAN communicating unit 14 and store information included in the beacon frame in the storing unit 12 or the memory 147.

Next, the controller 11 works together with the CPU 146 of the wireless LAN communicating unit 14 to execute a wireless LAN sleep entering process of the wireless LAN communicating unit 14, thereby causing the wireless LAN communicating unit 14 to enter sleep state (step S16).

Figure 8:
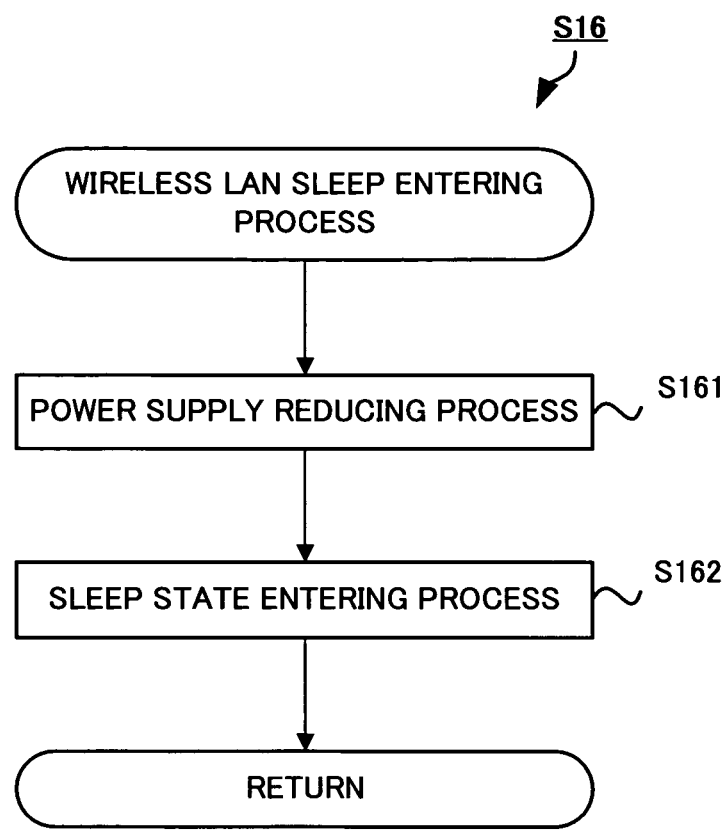
FIG. 8 is a flowchart showing an example of a wireless LAN sleep entering process.

As shown in FIG. 8, the controller 11 controls the power source 15 to shut off or reduce the power supply to each component of the wireless LAN communicating unit 14 whose functionality need not be maintained in sleep state (step S161). Next, the controller 11 executes a sleep state entering process (step S162). The controller 11 thus terminates the wireless LAN sleep entering process.

Note that even in a case in which the wireless LAN communicating unit 14 is in sleep state, the controller supplies power to the memory 147 in order to hold the data stored in the memory 147. The memory 147 thus holds the programs and communication setting information, etc., stored during the wireless LAN communication initializing process. The memory 147 also holds the information included in the beacon frame if the wireless LAN communicating unit 14 receives a beacon frame during the wireless LAN communication initializing process.

In the sleep state entering process (the process of step S162), the controller 11 controls the clock signal generating unit 145 to lower the frequency of the operating clock signal. The power consumed by the wireless LAN communicating unit 14 is thus reduced. Note that if the wireless LAN communicating unit 14 and the mobile terminal 1 are connected via an interface (for example, a PC card, a CF card, a USB, an SDIO, or the like), the controller 11 maintains that connection even if the wireless LAN communicating unit 14 is in sleep state.

Once the above processes are complete, the mobile terminal 1 is in standby state for cellular phone communication only.

Next, operations of the mobile terminal 1 in standby state for cellular phone communication only are described with reference to FIGS. 9 to 11.

Figure 9:
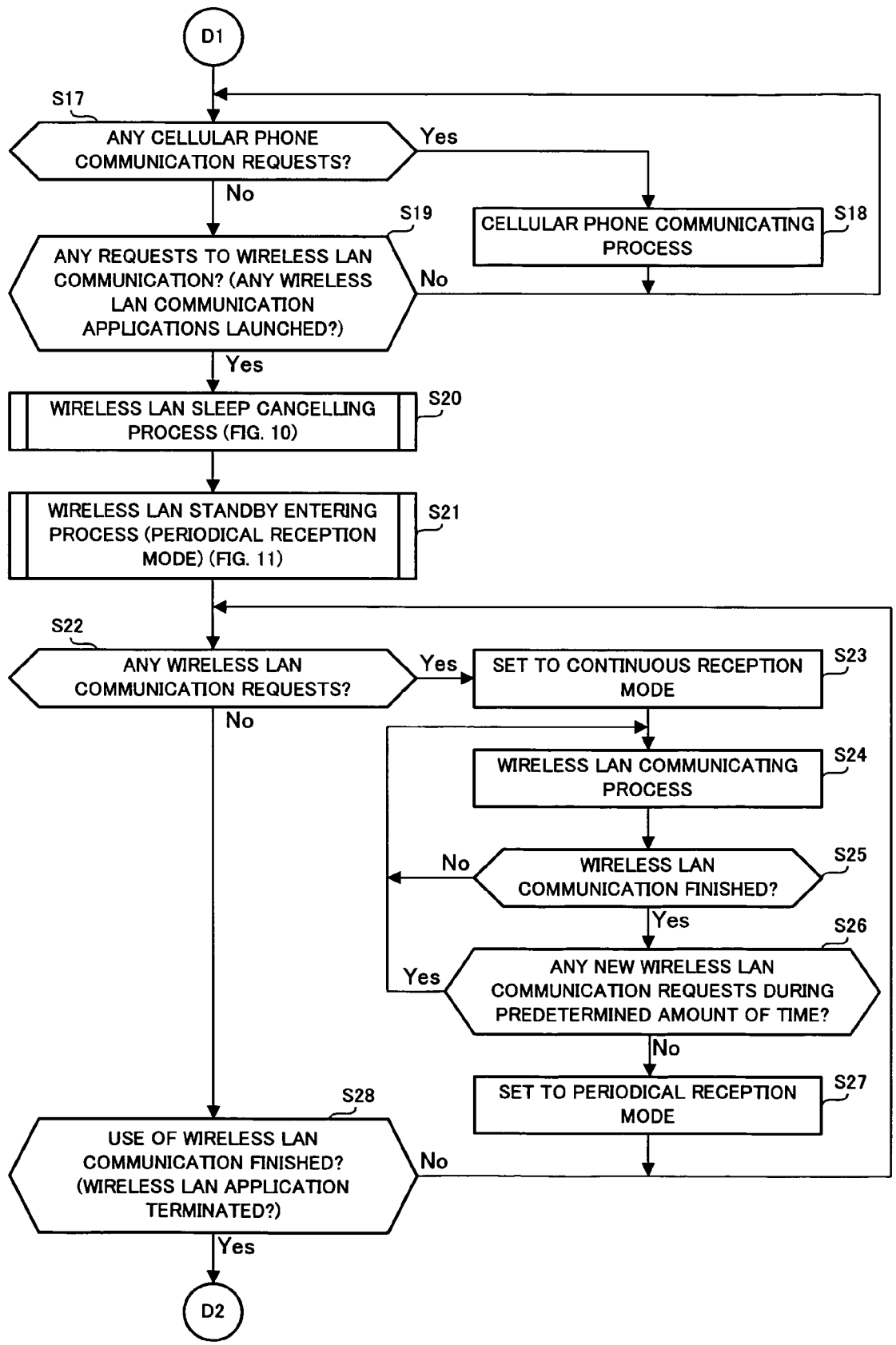
FIG. 9 is a flowchart showing an example of a communication process of a mobile terminal according to the first embodiment which is in standby state for only a cellular phone communication.

As shown in FIG. 9, the controller 11 waits for operation information to request cellular phone communication to be supplied (step S17). When operation information to request cellular phone communication is supplied (step S17: Yes), the controller 11 works together with the CPU 136 of the cellular phone communicating unit 13 to execute a cellular phone communicating process of the cellular phone communicating unit 13 (step S18). On the other hand, if operation information to request cellular phone communication is not supplied (step S17: No), the controller 11 identifies whether or not operation information to request the use of wireless LAN communication has been supplied, that is, whether or not an application which uses wireless LAN communication has been launched (step S19). If the controller 11 identifies that an application has been launched (step S19: Yes), the controller 11 registers communication system information indicating "Use wireless LAN communication" to the communication system storing area 121 of the storing unit 12.

Next, the controller 11 works together with the CPU 146 of the wireless LAN communicating unit 14 to execute a wireless LAN sleep canceling process of the wireless LAN communicating unit 14 (step S20). Note that "sleep canceling" means returning the wireless LAN communicating unit 14 to the state before entering sleep state.

Figure 10:
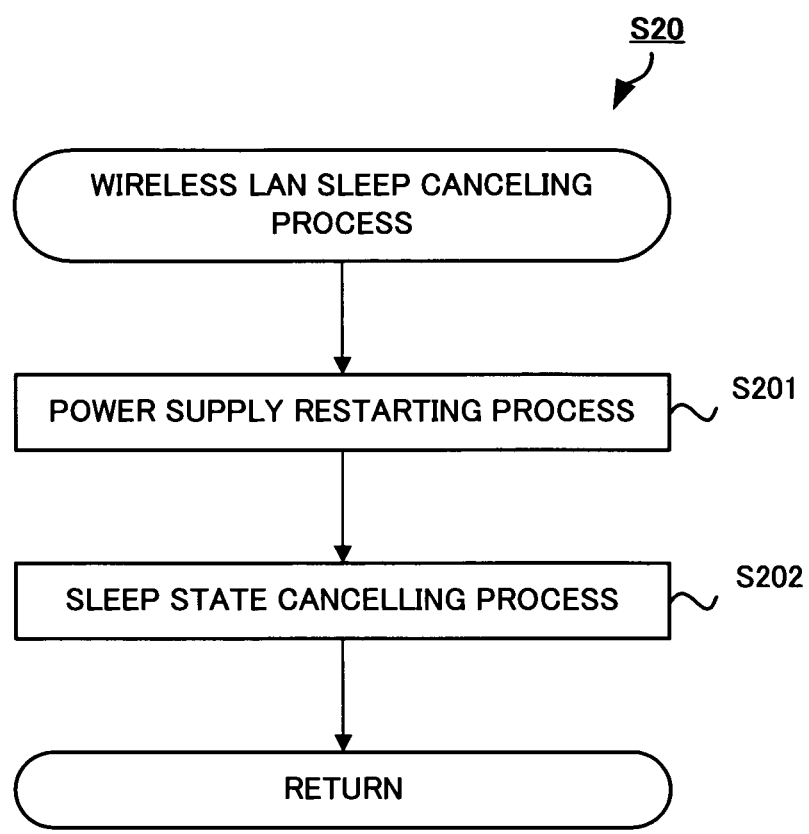
FIG. 10 is a flowchart showing an example of a wireless LAN sleep cancelling process.

As shown in FIG. 10, the controller 11 supplies power to components of the wireless LAN communicating unit 14 to which power had been shut off or reduced (step S201). Next, the controller 11 controls the clock signal generating unit 145 to switch the frequency of the operating clock signal to a higher frequency than in sleep state (step S202). The controller 11 thus terminates the wireless LAN sleep canceling process.

Referring back to FIG. 9, the controller 11 works together with the CPU 146 of the wireless LAN communicating unit 14 to execute a wireless LAN standby entering process of the wireless LAN communicating unit 14 (step S21).

Figure 11:
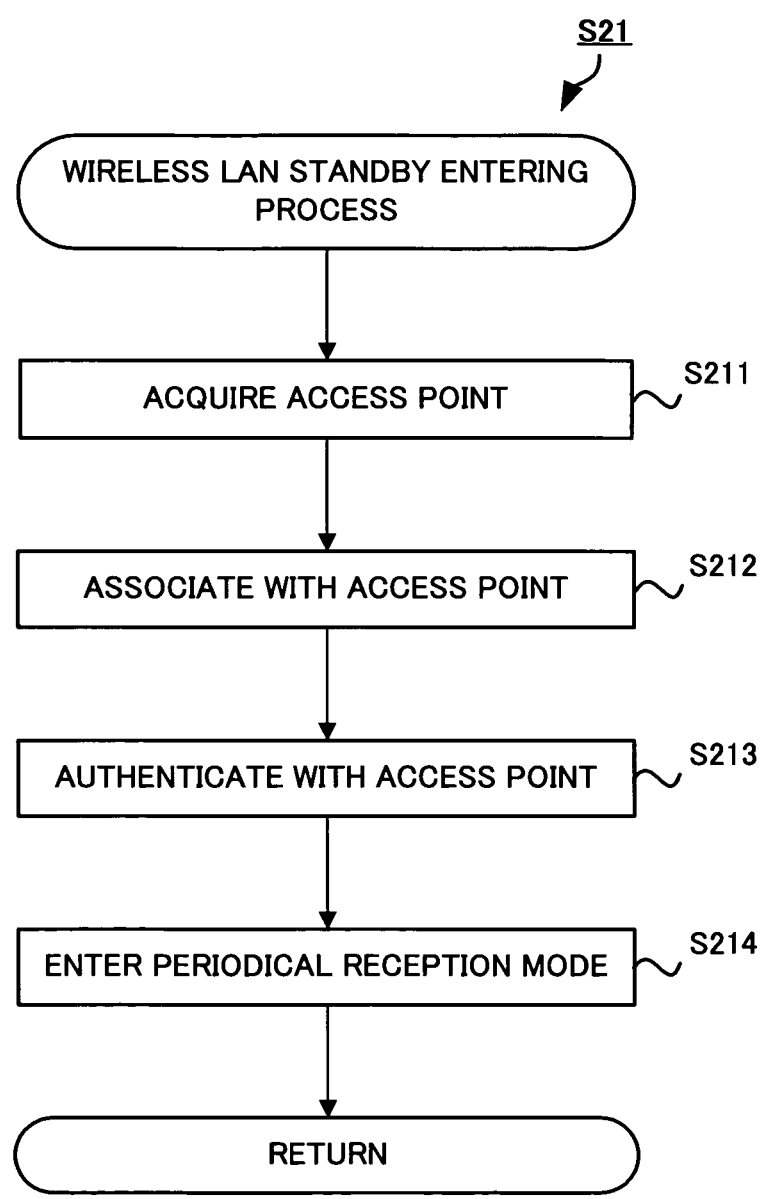
FIG. 11 is a flowchart showing an example of a wireless LAN standby entering process.

As shown in FIG. 11, the controller 11 executes a process for acquiring an access point (step S211). Next, the controller 11 executes an access point association process (step S212). The controller 11 further executes an authenticating process for being authenticated by the access point (step S213). The controller 11 puts the wireless LAN communicating unit 14 in periodical reception mode (step S214) in which the wireless LAN communicating unit 14 is put into a reception mode at an intermittent reception interval T. The controller 11 thus terminates the wireless LAN standby entering process.

Note that the process for acquiring an access point (the process in step S211) is completed by, for example, the wireless LAN communicating unit 14 receiving a beacon frame transmitted from the access point, or by, for example, the wireless LAN communicating unit 14 transmitting a probe request frame and receiving a probe response frame from the access point.

The access point association process (the process in step S212) is completed by the wireless LAN communicating unit 14 transmitting an association request frame to the access point and receiving an access response frame from the access point.

In the access point authenticating process (the process in step S213), the controller 11 executes a process in accordance with an authentication system needed by the access point, including open system authentication, shared key authentication, IEEE 802.1x authentication, and the like. The controller 11 also executes processes for acquiring an IP address as needed.

The standby state may be the continuous reception mode (active mode). However, from the point of view of reducing power consumption, using periodical reception mode is preferable.

Returning to FIG. 9, when the wireless LAN communicating unit 14 enters periodical reception mode, the controller 11 identifies whether or not wireless LAN communication has been requested (step S22). If wireless LAN communication is requested (step S22: Yes), the controller 11 sets the wireless LAN communicating unit 14 to continuous reception mode from periodical reception mode (step S23). After entering continuous reception mode (communication state), the controller 11 causes the wireless LAN communicating unit 14 to execute communication using wireless LAN (step S24). Once the wireless LAN communicating unit 14 initiates the wireless LAN communicating process of step S24, the controller 11 identifies whether or not the wireless LAN communicating process has finished (step S25). If the controller 11 identifies that the wireless LAN communication is not finished (step S25: No), the controller 11 causes the wireless LAN communicating unit 14 to continue the wireless LAN communicating process (step S24). If the wireless LAN communication is finished (step S25: Yes), the controller 11 launches the timer 111 to measure the time, and identifies whether or not a new request for wireless LAN communication has been made during a predetermined amount of time (step S26). If the wireless LAN communication is identified as having been requested (step S26: Yes), the controller 11 responds to the new communication request and causes the wireless LAN communicating unit 14 to perform communication in continuous reception mode (step S24). If the controller 11 identifies that no wireless LAN communication has been requested (step S26: No), the controller 11 causes the wireless LAN communicating unit 14 to execute wireless LAN communication in periodical reception mode (step S27).

The controller 11 identifies whether or not a new request for terminating the wireless LAN communication (step S28). If terminating the wireless LAN communication is requested (step S28: Yes), the controller 11 registers "Do not use wireless LAN communication" to the communication system information stored in the communication system storage area 121 of the storing unit 12. The controller 11 then moves the process to step S16 in FIG. 4. Note that in steps S22 to S27, even if terminating the application which is using the wireless LAN communication is requested, the controller 11 registers "Do not use wireless LAN communication" to the communication system information, and moves the process to step S16 in FIG. 4. The above operations are repeated thereafter.

On the other hand, if wireless LAN communication is not requested in standby mode (step S22: No), the controller 11 identifies whether a request to terminate wireless LAN communication (to terminate an application using wireless LAN communication) has been made or not (step S28). If a request to terminate wireless LAN communication has been made (step S28: Yes), the controller 11 terminates the process. If no request to terminate wireless LAN communication has been made (step S28: No), the controller 11 returns the process to step S22.

Note that in step S22, a case in which wireless LAN communication is requested is a case in which the controller 11 requests the wireless LAN communicating unit 14 to transmit data or a case in which the wireless LAN communicating unit 14 has received a beacon frames indicating that data addressed to the wireless LAN communicating unit 14 is present.

In step S23, if the controller 11 has changed the communication mode of the wireless LAN communicating unit 14 to continuous reception mode, wireless LAN communicating unit 14 announces to the access point that operation has switched from periodical reception operation to continuous reception operation. Specifically, the wireless LAN communicating unit 14 transmits a frame in which the Power Management bit has been set to 0 to the access point, and enters continuous reception mode. Note that in continuous reception mode, the wireless LAN communicating unit 14 does not need to transmit a PS-Poll frame to the access point. This makes high-speed data transmission and reception possible, as an excess waiting time is not created.

In step S25, the controller 11 identifies that communication has been terminated in, for example, the following cases. One is a case in which the wireless LAN communicating unit 14 has received an Ack frame transmitted from the access point. One is a case in which the wireless LAN communicating unit 14 has transmitted an Ack frame to a data frame received from the access point. One is a case in which a series of data communications in an upper-level protocol such as TCP/IP or an upper-level application has finished. One is a case in which the amount of time during which the wireless LAN communicating unit 14 has not performed any communication is measured, and a predetermined amount of time has elapsed.

In step S27, if the controller 11 has changed the communication mode of the wireless LAN communicating unit 14 to periodical reception mode, the wireless LAN communicating unit 14 announces to the access point that operation has switched from continuous reception operation to periodical reception operation. The wireless LAN communicating unit 14 therefore transmits a frame in which the power management bit has been set to 1 to the access point, and enters periodical reception mode.

Returning to FIG. 4, in the power on operation process (step S1), if the controller 11 identifies that the communication system information stored in the communication system storage area 121 is "Do not use cellular phone communication/use wireless LAN communication," the controller 11 moves to the process in step S31.

In this case, the controller 11 supplies power to the wireless LAN communicating unit 14 (step S31). Next, the controller 11 executes the wireless LAN communication initializing process to initialize the wireless LAN communicating unit 14 (step S32). Note that the wireless LAN communication initializing process is the same process as the process described in detail with reference to FIG. 7.

Next, the controller 11 executes a wireless LAN standby state entering process (step S33). Note that the wireless LAN standby entering process is the same process as the process described in detail with reference to FIG. 11. Regardless of the content of the communication system information, the controller 11 supplies power to the cellular phone communicating unit 13 (step S34). The controller 11 executes a cellular phone communication initializing process (step S35). The cellular phone communication initializing process is the same process as the process described in detail with reference to FIG. 5. Next, the controller 11 executes the cellular phone sleep entering process, and causes the cellular phone communicating unit 13 to enter sleep state (step S36). This process is a process for, on the one hand, stopping or reducing (for example by reducing the voltage) the power supply to components whose functionality need not be maintained, while on the other hand maintaining connection relations and the like.

Once the above processes are completed, the mobile terminal 1 is in standby state for wireless LAN communication only.

Figure 12:
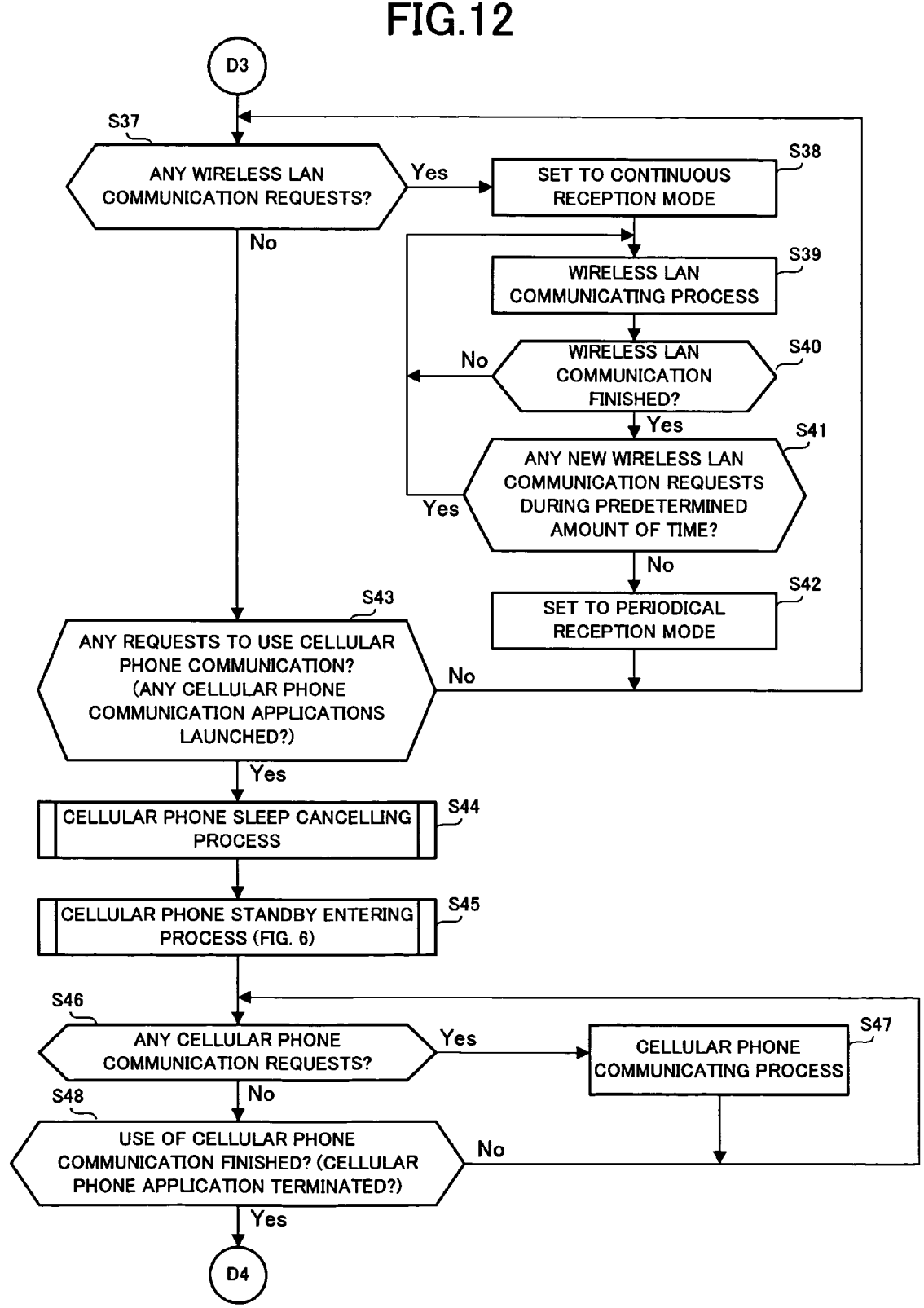
FIG. 12 is a flowchart showing an example of a communication process of a mobile terminal according to the first embodiment which is in standby state for only a wireless LAN communication.

As shown in FIG. 12, in standby state for wireless LAN communication only, the controller 11 identifies whether or not wireless LAN communication has been requested (step S37). If wireless LAN communication is requested (step S37: Yes), the controller 11 sets the wireless LAN communicating unit 14 to continuous reception mode (step S38), the same as in steps S23 to S27 in FIG. 9. The controller 11 performs communication using the wireless LAN communicating unit 14 (step S39), and identifies termination of the communication (step S40). The controller 11 then identifies the presence of any new requests for wireless LAN communication (step S41). If there are no new requests for wireless LAN communication (step S41: No), the controller 11 causes the wireless LAN communicating unit 14 to execute communication in periodical reception mode, thus restoring it to standby state (step S42), and moves the process to step S37.

On the other hand, if the wireless LAN communication is not requested in standby state (step S37: No), the controller 11 identifies the presence or absence of any use requests for cellular phone communication (requests to launch an application which uses cellular phone communication) (step S43). If there are no requests (step S43: No), the controller 11 returns the process to step S37 and waits until wireless LAN communication is requested. If the controller 11 identifies that the launch of an application which uses cellular phone communication has been requested (step S43: Yes), the controller 11 registers "Use cellular phone communication" to the communication system information. The controller 11 then executes a cellular phone sleep canceling process, and thereby cancels the sleep state of the cellular phone communicating unit 13 (step S44). Next, the controller 11 executes a cellular phone standby entering process (step S45), and thereby causes the cellular phone communicating unit 13 to enter the sleep state. Next, the controller 11 identifies whether or not cellular phone communication has been requested (step S46). If the controller 11 identifies that cellular phone communication has been requested (step S46: Yes), the controller 11 causes the cellular phone communicating unit 13 to execute an ordinary cellular phone communicating process (step S47).

On the other hand, if the controller 11 identifies that cellular phone communication has not been requested (step S46: No), the controller 11 identifies the presence of any requests to terminate cellular phone communication (to terminate an application which uses cellular phone communication) (step S48). If the controller 11 identifies that there have been no requests to terminate use of cellular phone communication (step S48: No), the controller 11 returns the process to step S46. If the controller 11 identifies that there has been a request to terminate use of cellular phone communication (step S48: Yes), the controller 11 registers "Do not use cellular phone communication" to the communication system information stored in the communication system storage area 121, and moves the process to step S36. The above operations are repeated thereafter.

Note that in the cellular phone sleep canceling process (the process in step S44), the controller 11, for example, supplies power for operating to components of the cellular phone communicating unit 13 to which power has been shut off or reduced (for example by reducing the voltage). For example, the controller 11 causes the clock signal generating unit 135 to switch the operating clock signal frequency (the frequency in standby state and communication state) to a frequency higher than in sleep state.

Returning to FIG. 4, in the power on operation process (step S1), if the controller 11 identifies that the communication system information stored in the communication system storage area 121 is "Use cellular phone communication and use wireless LAN communication," the controller 11 moves to the process in step S51.

In this case, the controller 11 executes supply of power to the cellular phone communicating unit 13 (step S51), an initializing process (step S52), and a standby entering process (step S53), thus setting the cellular phone communicating unit 13 to standby state. Next, the controller 11 causes a supply of power to the wireless LAN communicating unit 14 (step S54), an initializing process (step S55), and a standby entering process (step S56), thus setting the wireless LAN communicating unit 14 to standby state (steps S54 to S56). Note that the processes in steps S52, S53, S55, and S56 are the same processes as the processes described in detail with reference to FIG. 5, FIG. 6, FIG. 7, and FIG. 11.

Figure 13:
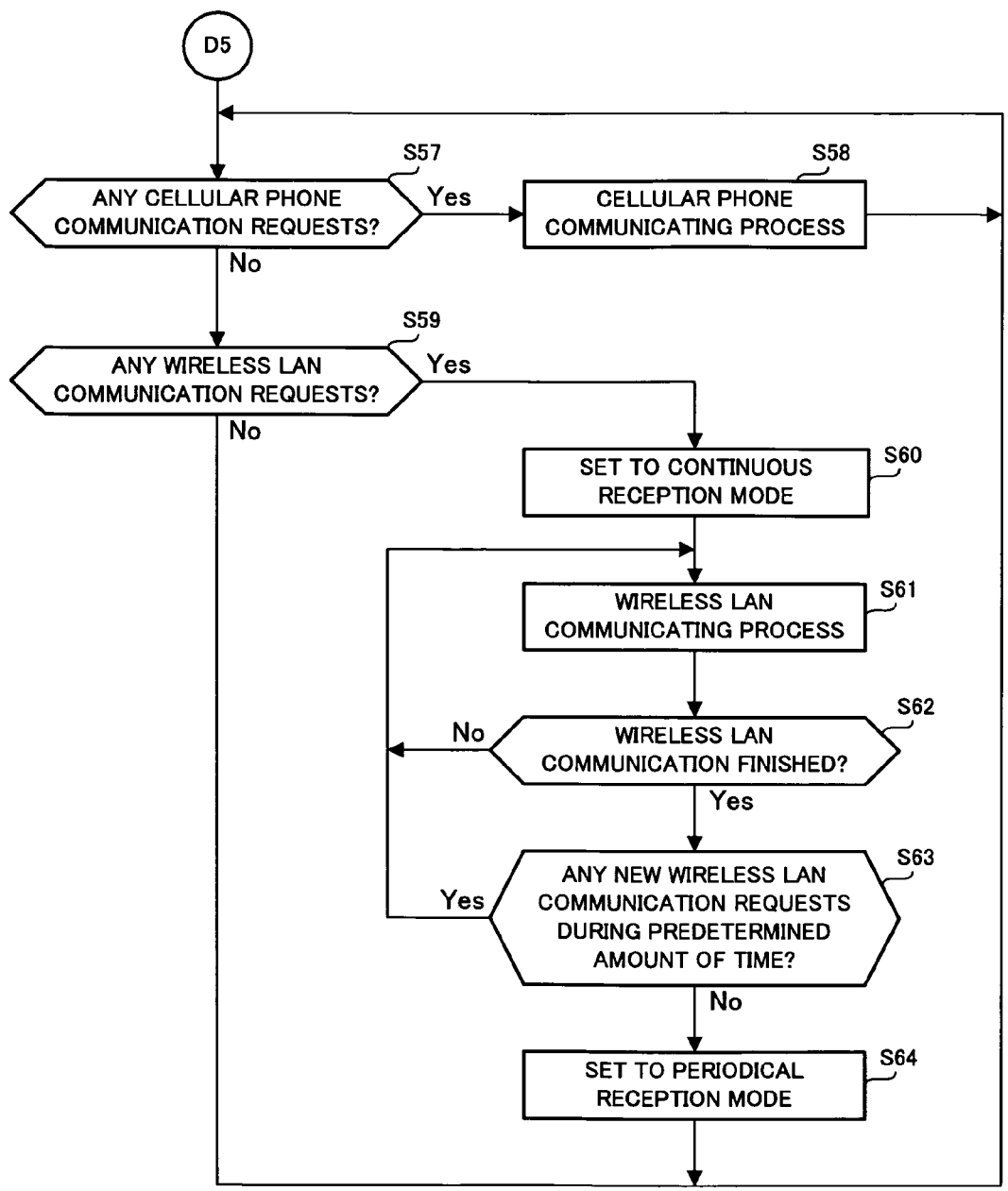
FIG. 13 is a flowchart showing an example of a communication process of a mobile terminal according to the first embodiment which is in standby state for a cellular phone communication and a wireless LAN communication.

Thereafter, as shown in FIG. 13, the controller 11 executes a cellular phone communicating process (step S57: Yes, step S58) and a wireless LAN communicating process (step S59; Yes, steps S60 to S64).

Note that in the process of FIG. 13, the wireless LAN communicating unit 14 transmits a frame in which the power management bit is set to 0 to the access point, notifies the access point that it has changed from periodical reception operation to continuous reception operation, and then enters continuous reception mode (step S60). The wireless LAN communicating unit 14 transmits a frame in which the power management bit is set to 1 to the access point, notifies the access point that it has changed from continuous reception operation to periodical reception operation, and then enters periodical reception mode (step S64).

As described above, with the first embodiment, the communicating units (the cellular phone communicating unit 13 and the wireless LAN communicating unit 14) are initialized beforehand, and then enter the sleep state. Supply of power to components which are not being used is therefore suppressed.

When selecting a communicating unit in sleep state for use, it is possible to use that communicating unit simply by cancelling the sleep state. There is therefore no need to perform an initializing process and a standby entering process every time this selection is made. Accordingly, compared to a case in which a stopped communicating unit is launched, the communicating unit can be switched to standby state in a short time, and communication can be executed quickly.

Further, since the wireless LAN communicating unit 14 performs periodical reception in standby state, power consumption by the wireless LAN communicating unit 14 can be suppressed.

(Modifications)

In the first embodiment, one communicating unit is initialized and maintained in standby state, before the next communicating unit is initialized. Specifically, the cellular phone communicating unit 13 is maintained in standby state and then the wireless LAN communicating unit 14 is initialized, or the wireless LAN communicating unit 14 is maintained in standby state and then the cellular phone communicating unit 13 is initialized. Thus, the load on the controller 11 is large, and the power consumed by the controller 11 is large. Therefore, in cases in which, for example, the battery is low, problems risk occurs. In particular, the load on the controller 11 is large when initializing one communicating unit while performing communication with the other communicating unit.

In order to avoid such problems occurring, a communication process by the communicating unit initialized first is inhibited, and then the other communicating unit is initialized. In order to inhibit the communicating process, the communicating unit initialized first is disabled, as discussed in detail below.

Below follows a description of operation of the mobile terminal 1 when performing a disabling process.

Figure 14:
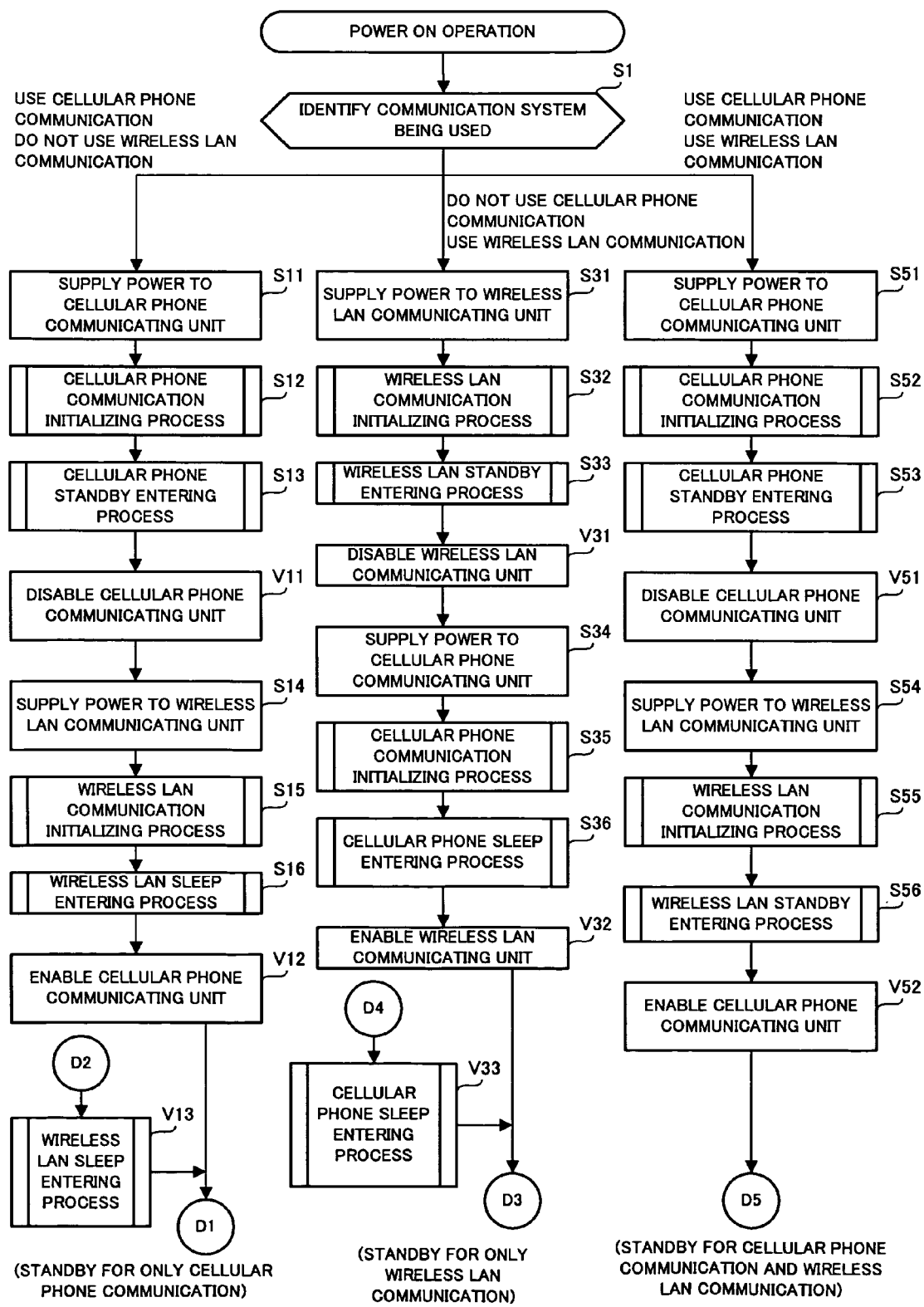
FIG. 14 is a flowchart showing a modification of a process of a mobile terminal according to the first embodiment.

As shown in FIG. 14, if, after turning on the power to the mobile terminal 1, the controller 11 identifies that the communication system information in step S1 is "Use cellular phone communication/Do not use wireless LAN communication," the controller 11 moves the process to step S11.

The controller 11 initiates supply of power to the cellular phone communicating unit 13 (step S11), initializes the cellular phone communicating unit 13 (step S12), and sets the cellular phone communicating unit 13 to standby state (step S13).

Next, the controller 11 gives the cellular phone communicating unit 13 a command to temporarily disable cellular phone communication (step V11). In response to this command, the CPU 136 of the cellular phone communicating unit 13 inhibits execution of transmitting and receiving processes in audio communication/data communication using cellular phone communication, transmission and reception of SMS (short message service), hand-over processes, and so on. By executing these processes, the controller 11 causes the cellular phone communicating unit 13 to enter a disabled state. However, the cellular phone communicating unit 13 does not discard setting parameters and the like.

With the cellular phone communicating unit 13 in a state in which the disabled state is maintained, the controller 11 supplies power to the wireless LAN communicating unit 14 (step S14), initializes the wireless LAN communicating unit 14 (step S15), and puts the wireless LAN communicating unit 14 to sleep (step S16).

Next, the controller 11 supplies a command to enable the cellular phone communicating unit 13 to the cellular phone communicating unit 13 (step V12). In accordance with this command, the CPU 136 of the cellular phone communicating unit 13 makes the transmitting and receiving processes, hand-over processes, and so on executable, thus restoring the cellular phone communicating unit 13 to standby state.

Thereafter, the controller 11 moves to the process in FIG. 9. If use of wireless LAN communication is finished (step S28: Yes), the controller 11 puts the wireless LAN communicating unit 14 to sleep (step V13) and moves the process to step S17.

Returning to FIG. 14, if, after turning on the power to the mobile terminal 1, the controller 11 identifies that the communication system information in step S1 is "Do not use cellular phone communication/use wireless LAN communication," the controller 11 moves the process to step S31. The controller 11 temporarily sets the wireless LAN communicating unit 14 to standby state (steps S31 to S33). Next, the controller 11 temporarily disables the wireless LAN communicating unit 14 (step V31). In a state in which the wireless LAN communicating unit 14 is maintained in a disabled state, the controller 11 initializes the cellular phone communicating unit 13 and causes it to enter a sleep state (step S34 to S36). Next, the controller 11 re-enables the wireless LAN communicating unit 14 (step V32), and thereafter moves to the process in FIG. 12. If an application which uses cellular phone communication has finished (step S48: Yes), the controller 11 causes the cellular phone communicating unit 13 to enter sleep state (step V33 in FIG. 14), and moves the process to step S37 in FIG. 12.

Returning to FIG. 14, if, after turning on the power to the mobile terminal 1, the controller 11 identifies that the communication system information in step S1 is "Use cellular phone communication and use wireless LAN communication," the controller 11 moves the process to step S51.

The controller 11 supplies power to the cellular phone communicating unit 13 (step S51), initializes it (step S52), and sets it to standby state (step S53).

Next, the controller 11 temporarily disables the cellular phone communicating unit 13 (step V51).

With the cellular phone communicating unit 13 in a state in which the disabled state is maintained, the controller 11 supplies power to the wireless LAN communicating unit 14 (step S54), initializes it (step S55), and causes it to enter standby state (step S56).

Next, the controller 11 re-enables the cellular phone communicating unit 13 (step V52), and thereafter moves the process to the process in FIG. 13.

With this modification, after one communicating unit has been put in a disabled state, the other communicating unit is initialized. Accordingly, the load on the controller 11 and the power source 15 is reduced.

Note that in this modification, an example was given of temporarily disabling either the cellular phone communicating unit 13 or the wireless LAN communicating unit 14, but this is not a limitation. For example, it is also possible to initialize one communicating unit while inhibiting communication by the other communicating unit and thus suppressing the load on the controller 11 and the power consumed by the controller 11.

Second Embodiment

In the first embodiment, when a communication request is made to the wireless LAN communicating unit 14 in standby state, the operating state of the wireless LAN communicating unit 14 is changed from periodical reception mode to continuous reception mode.

However, in continuous reception mode, the wireless LAN communicating unit 14 is always operable, and therefore the power consumed by the wireless LAN communicating unit 14 increases. Accordingly, to reduce the power consumption, it is possible for the wireless LAN communicating unit 14 to receive data periodically during communication.

Below follows a description of the mobile terminal 1 performing such a periodical reception process, with reference to FIGS. 15, 16A, 16B, and 16C. The following example is an example in which the wireless LAN communicating unit 14 switches the interval for receiving in a standby state and a communication state.

The basic constitution of the mobile terminal 1 of the present embodiment is the same as the constitution shown in FIG. 1. However, preset and mutually differing beacon reception intervals T1 and T2 are stored to the beacon reception interval storage area 122 of the storing unit 12. The beacon reception intervals T1 and T2 are in a relationship in which T1>T2.

Figure 16A:
FIG. 16A is a diagram showing an example of a timing with which a beacon frame is transmitted from an access point.
Figure 16B:
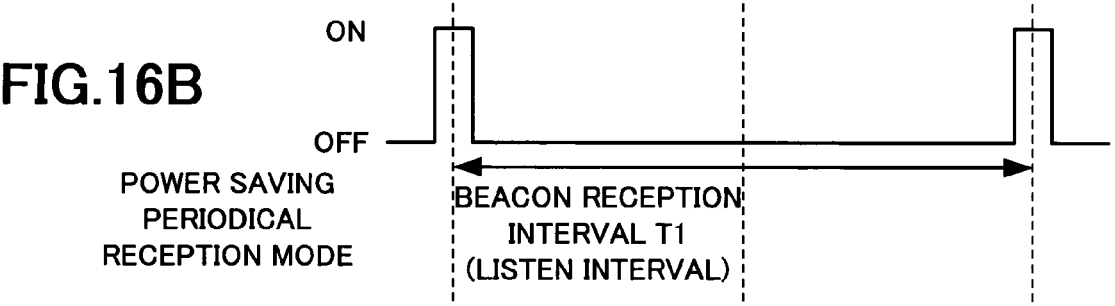
FIG. 16B is a diagram showing an example of a timing of reception of a beacon frame in a power-saving periodical reception mode of a mobile terminal according to the second embodiment.
Figure 16C:
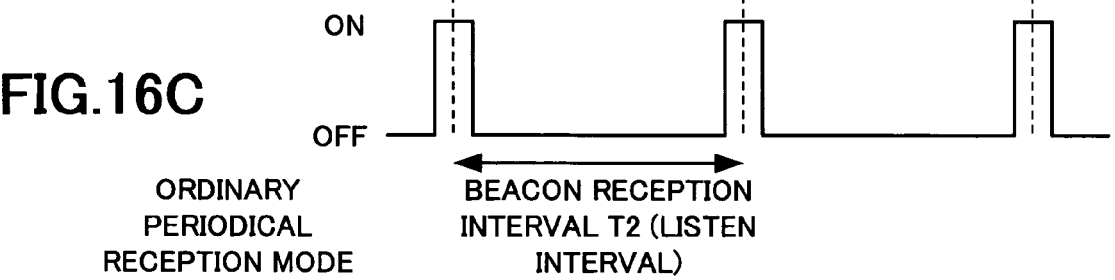
FIG. 16C is a diagram showing an example of a timing of reception of a beacon frame in an ordinary periodical reception mode of a mobile terminal according to the second embodiment.

The wireless LAN communicating unit 14 is provided with a power saving periodical reception mode and an ordinary periodical reception mode. As shown in FIG. 16A, a beacon frame is periodically transmitted at a beacon interval from the access point. In a power saving periodical reception mode, the wireless LAN communicating unit 14 receives a beacon frame transmitted at fixed time (the beacon interval) at a period T1, as shown in FIG. 16B. In an ordinary periodical reception mode, the wireless LAN communicating unit 14 receives a beacon frame transmitted at fixed times (the beacon interval) in a period T2, as shown in FIG. 16C.

Figure 15:
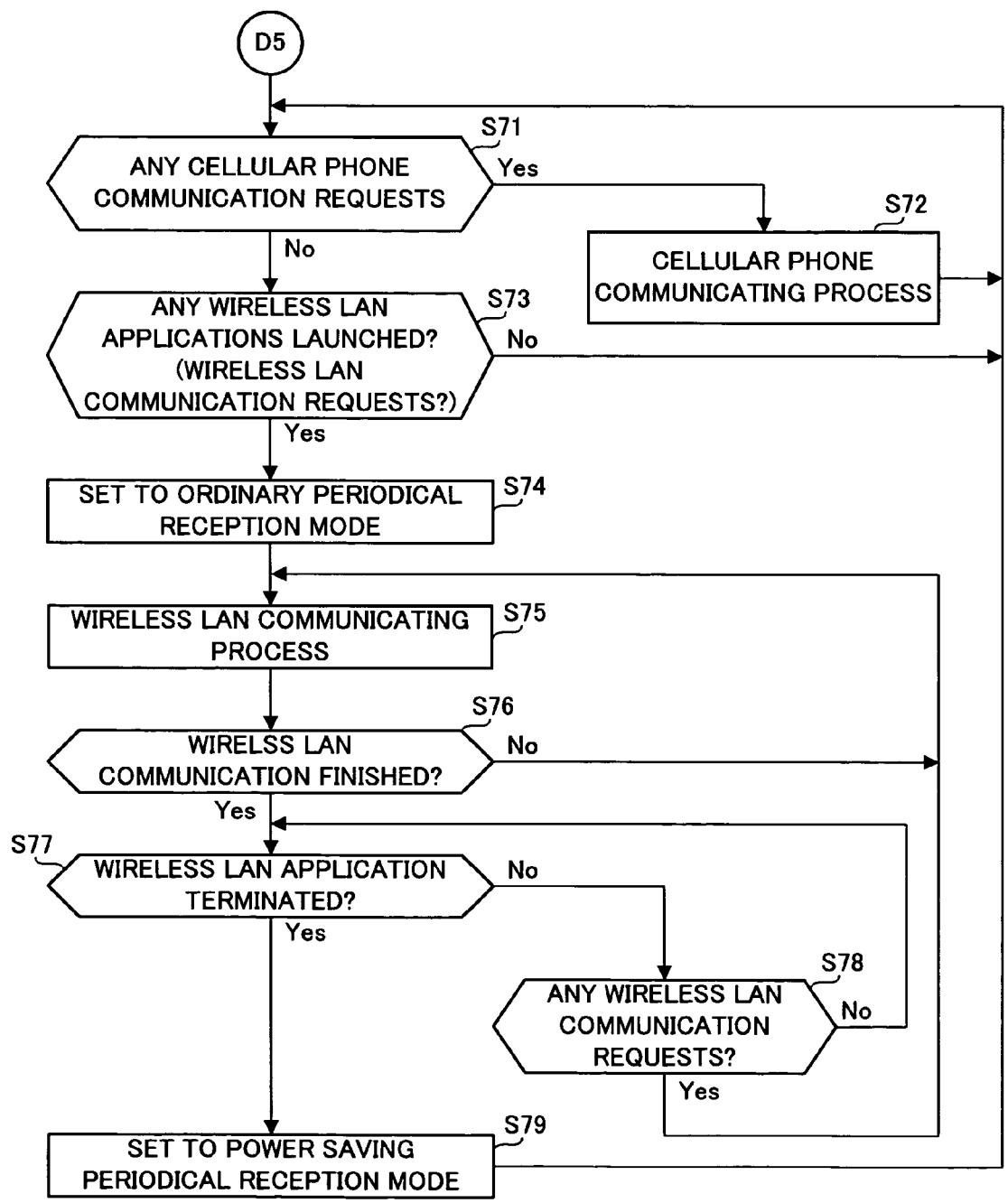
FIG. 15 is a flowchart showing an example of a process of a mobile terminal according to a second embodiment.

Operation of the mobile terminal of the present embodiment from initiating wireless LAN communication to terminating it is described, with reference to FIG. 4 and FIG. 15. Note that when launching the process in FIG. 15, no applications which use wireless LAN communication are launched.

If, after turning on the power to the mobile terminal 1, the controller 11 identifies in step S1 shown in FIG. 4 that the communication system information is "Use cellular phone communication and use wireless LAN communication," the controller 11 first executes the process in steps S51 to S55.

Next, the controller 11 executes a wireless LAN standby state entering process. At this point, the controller 11 causes the wireless LAN communicating unit 14 to execute periodical reception operation at the period T1.

As shown in FIG. 15, in this standby state, the controller 11 identifies whether or not cellular phone communication has been requested (step S71).

If the controller 11 identifies that cellular phone communication has been requested (step S71: Yes), the controller 11 causes the cellular phone communicating unit 13 to execute an ordinary cellular phone communicating process (step S72).

If the controller 11 identifies that cellular phone communication has not been requested (step S71: No), the controller 11 identifies the presence of any launching of applications which use wireless LAN communication (step S73).

If the controller 11 identifies that no applications using the wireless LAN communication have been launched (step S73: No), the controller 11 waits until a cellular phone communication request is made (step S71).

If the controller 11 identifies that an application using the wireless LAN communication has been launched (step S73: Yes), the controller 11 sets the wireless LAN communicating unit 14 to ordinary periodical reception mode in order to be able to receive beacon frames at the beacon reception interval T2 (step S74).

The wireless LAN communicating unit 14 executes wireless LAN communication with other devices in ordinary periodical reception mode (step S75).

Next, the controller 11 identifies whether or not wireless LAN communication using the wireless LAN communicating unit 14 has finished (step S76). If the controller 11 identifies that wireless LAN communication using the wireless LAN communicating unit 14 has not finished (step S76: No), the controller 11 causes the wireless LAN communicating unit 14 to continue wireless LAN communication.

If the controller 11 identifies that wireless LAN communication using the wireless LAN communicating unit 14 has finished (step S76: Yes), the controller 11 identifies whether or not an application using the wireless LAN communicating unit 14 is finished (step S77). If the controller 11 identifies that the application is finished (step S77: Yes), the controller 11 sets the wireless LAN communicating unit 14 to power saving periodical reception mode (step S79) so as to receive beacon frames at the beacon reception interval T1. If the controller 11 identifies that the application using the wireless LAN communicating unit 14 is not finished (step S77: No), the controller 11 identifies the presence of a request for wireless LAN communication (step S78). If there is a request for wireless LAN communication (step S78: Yes), the controller 11 causes the wireless LAN communicating unit 14 to perform wireless LAN communication in ordinary periodical reception mode (step S75). If there is no request for wireless LAN communication (step S78: No), the controller 11 waits until the application is finished.

As described above, with the second embodiment, the wireless LAN communicating unit 14 performs periodical reception operation even in the communication state. Accordingly, power consumption can be suppressed compared with the wireless LAN communicating unit 14 of the first embodiment. Since the beacon reception interval T1 when in a standby state is set larger than the beacon reception interval T2 when in the communication state, power consumption in a standby state can be reduced.

Note that the present invention is not limited to the embodiments described above, but may be modified and adapted in a variety of ways.

The wireless communication system is not limited to cellular phone communication and wireless LAN communication. For example, the present invention can be applied to a wireless communicating unit for processing WiMAX (Worldwide Interoperability for Microwave Access), Bluetooth (registered trademark), UWB (Ultra Wide Band), and so on.

The number of wireless communicating units performing varieties of mutually differing wireless communication is not limited to two, but three or more wireless communicating units may be provided. In such a case, it would suffice to store in association the wireless communicating units provided to the mobile terminal 1 (the communication systems of each wireless communicating unit) and whether or not each wireless communicating unit is being used, in the communication system information of the communication system storage area 121. For example, it would suffice to store information indicating, for example, "Use WiMAX communication and cellular phone communication/do not use wireless LAN communication," or "Use all wireless communication systems."

In the above embodiments, the communication system being used is set on the basis of control information (communication system information) stored in the communication system storage area 121. This constitution is not a limitation, however. It is also possible to set this using stored data in an external memory. It is also possible for a user to edit the control information.

In the above embodiments, descriptions were given with the controller 11 at the center, performing the initializing processes, the standby entering process, and so on of the cellular phone communicating unit 13 and the wireless LAN communicating unit 14, in order to simplify understanding. However, if it is possible to realize a substantially similar function, this method is not a limitation. For example, it is also possible for the controller 11 to give commands to initiate processes to the CPU 136 and 146, and for the CPU 136 and 146 to execute the processes.

It is also possible for the user to change the beacon reception interval T in the first embodiment and the beacon reception intervals T1 and T2 in the second embodiment via the inputting unit 16. In this case, the controller 11, in response to operation of the inputting unit 16, updates the beacon reception interval stored to the beacon reception interval storage area 122 of the storing unit 12. Thus, the user can execute periodical reception operations at any interval, according to the radio wave reception conditions and the frequency of use of wireless communication.

In the above embodiments, initializing of one communicating unit and initializing of another communicating unit was done, for example, in order, as shown in FIG. 4, but it is also possible to do this in parallel.

In the above embodiments, the present invention was described using a mobile terminal as an example, but the present invention is not limited to this. Devices capable of performing various types of wireless communication, particularly portable-type electronic devices, may be used, such as computer, PDA (Personal Digital Assistance), navigation, clock, music playback devices, and so on.

Portable-type electronic devices according to the present invention can be realized using ordinary computers, and not specialized systems. For example, it is also possible to store a program for executing the above operations on a storage medium (such as a flexible disk, a CD-ROM, a DVD-ROM, and so on) readable by a computer system and distribute this, thus constituting the portable-type electronic device for executing the above processes by installing this program on a computer system.

It is also possible to store the program in a storage provided to a server device on a communication network such as the internet, and constitute the portable-type electronic device by downloading, etc., using an ordinary computer system.

It is also possible to store only applications to a storage medium or to storage, in a case in which the functions described above are divided between an OS (Operating System) and applications, or realized through cooperation between an OS and applications.

It is also possible to superimpose the program on carrier waves and distribute it via a communication network. For example, it is also possible to distribute the program via a network by posting the program to a bulletin board system on a communication network. A constitution is also possible in which the above processes are executable by launching the program and executing it under the control of an OS in the same manner as other application programs.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

The present application is based on Japanese Patent Application No. 2007-106071, filed on Apr. 13, 2007. The specification, claims, and all drawings thereof are hereby incorporated in the present specification.

What is claimed is:

1. A communication terminal, comprising:
   a first communicating unit that performs wireless communication;
   a second communicating unit that performs a type of wireless communication different from the first communicating unit; and
   a controller that controls the first communicating unit and the second communicating unit;
   wherein the controller causes the first communicating unit to execute an initialization process for initiating wireless communication by the first communicating unit and then causes the second communicating unit to execute an initialization process for initiating wireless communication by the second communicating unit when power to the communication terminal is turned on;
   once the first communicating unit has completed the initialization process, causes the first communicating unit to execute a standby entering process for entering a standby state capable of wireless communication;
   once the second communicating unit has completed the initialization process, causes the second communicating unit to execute a sleep entering process for entering a sleep state in which wireless communication is halted; and
   stops wireless communication by the first communicating unit until the second communicating unit completes the initialization process when the first communicating unit is in the standby state and the controller causes the second communicating unit to execute the initialization process.

2. The communication terminal according to claim 1, wherein:
the controller causes the second communicating unit to execute a sleep canceling process for canceling a sleep state when the second communicating unit executes wireless communication; and causes the second communicating unit to execute a first standby entering process for entering a first reception state when the sleep canceling process is complete.

3. The communication terminal according to claim 1, wherein: the controller further comprises an application commanding unit for commanding an application using the second communicating unit to launch or stop; and the controller causes the second communicating unit to perform the sleep canceling process for canceling the sleep state when the application commanding unit commands the application to launch while the second communicating unit is in a sleep state, causes the second communicating unit to execute a first standby entering process for entering a first reception state once the sleep canceling process is complete, and causes the second communicating unit to execute a second standby entering process for entering a second reception state once the first standby entering process is complete.

4. The communication terminal according to claim 3, wherein the controller causes the second communicating unit to execute a reception operation changing process for entering a first reception operation state from a second reception operation state, when the second communicating unit has finished wireless communication.

5. The communication terminal according to claim 4, wherein: the controller further comprises a timer that measures time and identifies that a predetermined amount of time has elapsed; and the controller that launches the timer when the second communicating unit has finished wireless communication, and causes the second communicating unit to execute the reception operation changing process when the timer has measured a predetermined amount of time.

6. The communication terminal according to claim 3, wherein the first reception state is a state in which data is periodically received at a predetermined interval and the second reception state is a state in which data is received continuously.

7. The communication terminal according to claim 3, wherein the first reception state is a state in which data is periodically received at a predetermined interval and the second reception state is a state in which data is received periodically at an interval shorter than the predetermined interval.

8. The communication terminal according to claim 1, wherein: the second communicating unit comprises an operating clock signal generating unit that generates an operating clock signal of the second communicating unit; and the operating clock signal generating unit generates an operating clock signal having a lower frequency than a frequency before entering the sleep state, when the second communicating unit enters the sleep state.

9. The communication terminal according to claim 1, wherein: the second communicating unit comprises a storing unit that stores information generated before the second communicating unit enters sleep state; and the storing unit holds the information generated after the second communicating unit enters the sleep state.

10. The communication terminal according to claim 1, comprising a power source for reducing or stopping a supply of power to component elements provided to the second communicating unit, operation of which component elements need not be maintained in the sleep state, when the second communicating unit is in the sleep state.

11. A non-transitory computer-readable storage medium storing a non-transitory program for causing a computer, when launching, to perform the steps of:
causing a first communicating unit to execute an initialization process, and to execute a standby entering process for entering a standby state when the initialization process is complete; and
causing a second communicating unit to execute an initialization process and to execute a sleep entering process for entering a sleep state when the initialization process is complete
wherein communication by the first communicating unit is stopped until the second communicating unit completes an initializing process, in a case in which the first communicating unit is in a standby state when the controller causes the second communicating unit to execute an initializing process.

* * * * *